March 14, 1961  J. O. GARRISON  2,974,968
WORK HOLDER
Filed Sept. 3, 1959

INVENTOR.
JAMES O. GARRISON
BY *Tom Walker*
ATTORNEY

United States Patent Office 2,974,968
Patented Mar. 14, 1961

2,974,968
WORK HOLDER

James O. Garrison, Dayton, Ohio, assignor to Garrison Machine Works, Inc., Dayton, Ohio, a corporation of Ohio Filed Sept. 3, 1959, Ser. No. 837,978
14 Claims. (Cl. 279—106)

This invention relates to work holders, and particularly to collet type chucks characterized by a circumferential series of chuck jaws capable of progressive radial motion to grip and to release a centrally positioned work piece.

The object of the invention is to simplify the construction as well as the means and mode of operation of work holders, whereby such holders may not only be economically manufactured, but will be more efficient and satisfactory in use, adaptable to a wide variety of applications, and be unlikely to get out of order.

An object of the invention is to present a work holder or chuck as described especially adapted for chucking ultra-precision parts yet sufficiently rugged for general service.

Another object of the invention is to enable the work holder to be modified for use with a wide variety of types and sizes of work pieces without dismantling or modifying the basic assembly.

A further object of the invention is to utilize a generally new principle of sliding motion of the chuck jaws characterized by simplicity of construction plus a high degree of accuracy in the maintaining of the same positions of the chuck jaws relative to one another.

A still further object of the invention is to provide, in a collet type chuck as described, for chucking in different transverse planes through a single set of chuck jaws, it being a further and related object in this connection to achieve a sequential gripping of the work piece in the different planes.

A further object of the invention is to provide a work holder possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 1:
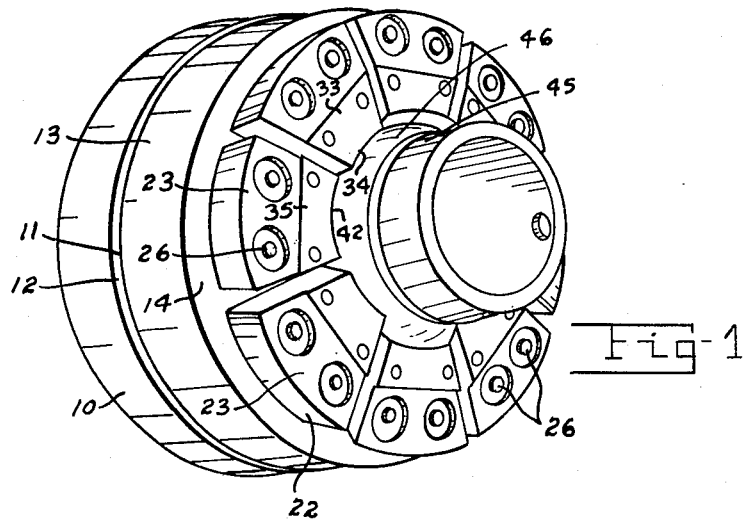
Figure 2:
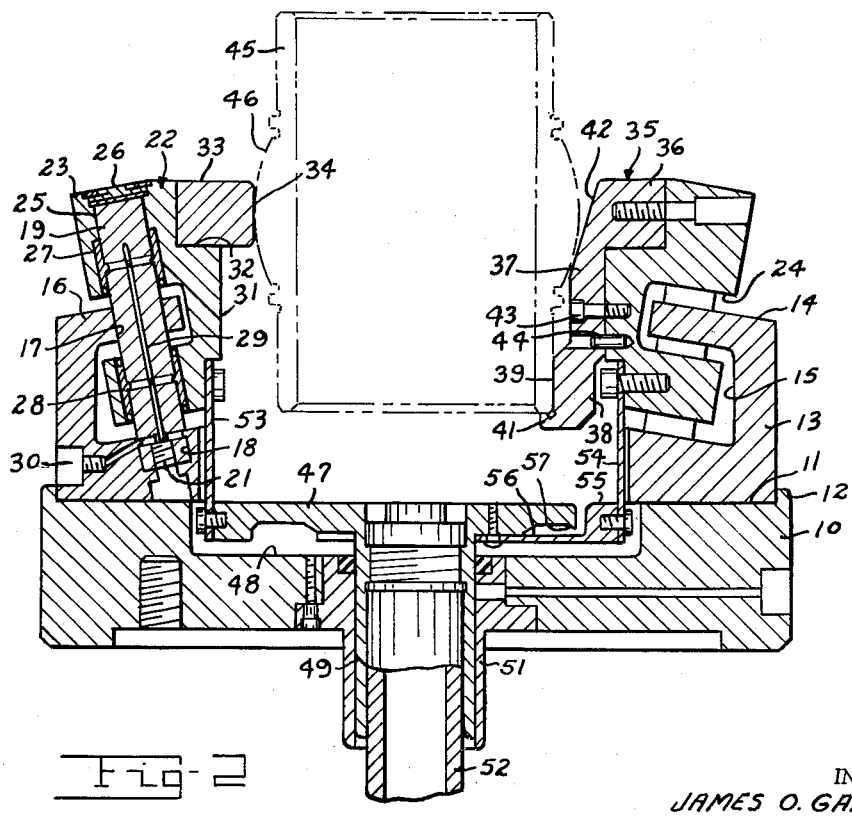

Referring to the accompanying drawing wherein is shown one but obviously not necessarily the only form of embodiment of the invention, Fig. 1 is a view in perspective of a work holder in accordance with the illustrated embodiment of the invention; and Fig. 2 is a view of the work holder in longitudinal section, the presence of a work piece between the chuck jaws being indicated in dot dash outline.

Like parts are indicated by similar characters of reference throughout the several views.

Referring to the drawing, in accordance with the illustrative embodiment of the invention a work holder comprises a mounting or face plate 10 adapted to be secured in a suitable manner to a machine mount or the like. The upper surface of the plate 10 is recessed to form a planar surface 11 and an annular rim 12. A ring 13 seats on the surface 11 and is engaged at its outer periphery by the rim 12 in such manner as to be held from lateral motion thereby relatively to the plate 10. Through the use of bolts or other connections the ring 13 is held to a seat on the surface 11 and so becomes stationary relative to the plate 10. The ring 13 accordingly is in effect a part of the plate 10 and is made separable therefrom as a matter of manufacturing expedience.

While the bottom of the ring 13 is flat for flush seating on the surface 11, the top thereof has a conical shape defining an inclined surface 14. In the inner periphery of the ring, and angularly cut therein to parallel the surface 14, is an annular recess 15. The construction is such as to form the ring 13 with an angularly disposed wall 16 at its upper end. In this wall is a circular series of through openings 17 perpendicular to the surface 14. Aligned with each opening 17 on the opposite side of the recess 15 is a recess 18. Each opening 17 and its aligned recess 18 provides a mounting for a bar or post 19. One end of each post 19 seats firmly in its recess 18 and the post extends therefrom through the recess 15 and through and beyond the opening 17, the upper or opposite end of the post terminating an appreciable distance above upper ring surface 14. The post is mounted in the recess 18 and opening 17 to have a relatively closely fitting bearing therein. As a result each post is positively held against angular displacement in the ring 13, and, as indicated, the posts are constrained to assume an attitude of upward and outward inclination relative to the longitudinal axis of the ring 13. At its lower end each post 19 has an axial tapped recess 21 into which a bolt may enter through the bottom of ring 13 to hold the post to its seat in the recess 18.

The openings 17 and recesses 18 in the ring 13, and the posts 19 mounted therein, are provided in adjacent equidistant pairs. Mounted on each pair of posts is a chuck jaw 22, the arrangement being one in which each jaw is mounted for sliding motion on a pair of spaced apart posts 19 so that angular displacement of individual jaws positively is prevented. In any position of longitudinal adjustment along the posts 19, therefore, the several chuck jaws 22 maintain a constant relative position.

The several chuck jaws are provided with detachable extensions or "false jaws" which may differ structurally from one another. The basic jaw configuration is in all instances the same. Thus, each jaw has on its upper end a surface 23 parallel to the surface 14 on the ring 13. Further, on what may be considered the outer end of the jaw there is formed a recess 24 fitting over the wall 15 of the ring 13 and having upper and lower surfaces parallel to such wall and to the surface 23. Each jaw 22 further is provided with a longitudinal through bore 25 having a sliding fit with the exterior of a post 19. A counter-bore in the upper end of the bore 25 accommodates an insert means 26 protecting the bearing surface between bore 25 and post 19 from access thereto by emery dust, water and the like. Also within each chuck jaw respectively above and below the recess 24 are bushings 27 and 28 suitably closed against dirt by seals. Lubricant for the bushings is supplied through post 19 by a conduit 29, it in turn being supplied through oiler 30.

At what may be considered to be the inner or front end of each chuck jaw 22 there is defined a longitudinal surface 31 parallel to the longitudinal axis of ring 13 and terminating at its upper end in an indentation 32. The so-called "false jaws," which comprise the work gripping portions of the chuck, are mounted in a detachable manner upon the surface 31 or in the indentation 32 or both. In the illustrated instance, the work holder makes use of work gripping portions of two kinds with the jaws alternating in their use of the different "false jaws."

In the one instance every other jaw 22 has mounted in the inset 32 an inwardly projecting gripping portion 33 having a face 34 which may be cupped or arcuate for engagement with the work. In alternating relation to the jaws 22 having the gripping portions 33 the remaining jaws of the cirmcumferential series have detachably mounted thereon "false jaws" 35 each of which comprises a portion 36 seated in inset 32, an intermediate portion 37 extending downwardly along the surface 31 and a downwardly projecting dependent portion 38 formed with a longitudinally extending planar surface 39 and an inturned lip 41. The "false jaw" 35 is cut away at its upper end along a line 42 to obviate inward radial projection thereof to the same extent as the "false jaw" 33. It will be understood that the several "false jaws" are secured to their basic jaw structures in a detachable manner through the use of bolts and the like. In the case of the "false jaws" 35 these may include a bolt 43 extending through the intermediate portion 37 into the jaw proper as well as a dowel pin 44 securing and maintaining an accurate vertical alignment of the "false jaw." The use of "false jaws" of varying constructions to suit the requirements of the work is contemplated by the invention. In the illustrated instance a part 45 is required to be chucked, this part having a cylindrical shape and being formed intermediate its ends with a bulbous surface 46. In the chucking of this part the jaws 22 equipped with the "false jaw" 35 engage one end of the part through the surfaces 39 and lips 41. Those jaws 22 equipped with "false jaw" 33 on the other hand project directly and radially inwardly and grip the work piece at the bulbous surface 46. The work piece is thus firmly held against axial inward motion, against lateral movement and against tilting or angular movement. Contributing particularly to the latter result is the action of the surfaces 34 and 39 in gripping the work in longitudinally spaced apart transverse planes.

The chuck is locked to and released from the work piece by sliding movements of the chuck jaws 22 upon the posts 19. Upward motion of the chuck jaws thereon has the effect, it will be understood, of withdrawing the "false jaws" from contact with the work whereas a drawing downward of the chuck jaws upon the posts has the opposite effect, causing a radial inward movement of the jaws into gripping engagement with the work. Effecting such sliding movement of the chuck jaws is a disc 47 coaxially disposed of the ring 13 and received in a recess 48 in the surface 11 of plate 10. The disc 47 has a central sleeve 49 thereon projecting through and beyond the face plate 10 and having a sliding bearing in a bushing 51 in the plate. A shaft or draw bar 52 enters sleeve 49 from the outer end thereof and is threaded or otherwise secured to the sleeve and to disc 47. Axial reciprocation of the draw bar 52, under machine or manual control, accordingly effects a corresponding movement of the disc 47. The disc 47 is connected to the chuck jaws through peripherally attached links. In the case of those jaws mounting the "false jaw" 33, links 53 are directly attached at their lower ends to the periphery of disc 47 and directly attached at their upper ends to the jaws 22. In the case of the jaws 22 mounting "false jaw" 35 links 54 like the links 53 are connected at their upper ends to the jaws 22 and at their lower ends to the outer extremities of arms 55 fastened to the underside of the disc 47 to project circumferentially thereof. The links 53 and 54 are flat and made of spring steel or the like to be flexible. Hence the angular motion of the chuck jaws may be accommodated to the axial movement of the disc 47. Similarly, the arm 55 comprises a thin flexible portion 56 which underlies the disc 47. The latter is, further, cut away to define a finger 57 normally elevated above the thin portion 56 of the arm at a point adjacent to the outer end thereof. The construction is one providing for a sequential gripping and releasing of the chuck jaws in the different planes.

Thus, an initial inward or downward motion of the disc 47 effects equal and corresponding motion of all of the chuck jaws 22, this phase of a retracting or locking up movement continuing until the work engaging surfaces on "false jaws" 35 achieve a gripping relation with the work piece. A complete downward or pulling motion of the disc 47 includes a continuing movement beyond that necessary to lock up false jaws 35, and, in the course of and in response to this continued movement those jaws 22 mounting "false jaws" 33 are further retracted to engage "false jaws" 33 with the work piece. This continued motion is accomplished relative to the jaws mounting false jaws 35 and is permitted by a flexing of portions 56 of arms 55. The fingers 57 are engageable with arms 55 to limit the described continuing relative motion of the disc 47. In accordance with one aspect of this inventive concept the amount of required motion of the "false jaws" 35 is relatively slight. The dependent portions 38 of these jaws in effect provide a socket within the work holder in which the work piece 45 may be inserted to achieve an initial aligning thereof within the chuck. The "false jaws" 33 are normally more widely spaced in order freely to permit insertion and withdrawal of the work piece. Release of the chuck from a locked up condition finds the "false jaws" 35 retracted but slightly from their gripping position as compared to the more extended movement of "false jaws" 33, these actions taking place sequentially in inverse order to the grouping movements.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A work holder, including a mounting plate, a circular series of posts stationarily supported on said plate, said posts being mounted on end and projecting from said plate in relatively inclined relation, chuck jaws slidably mounted on said posts to move in relatively converging and diverging directions thereon, and means to slide said chuck jaws on said posts.

2. A work holder, including a mounting plate, a circular series of posts stationarily supported on said plate, said posts being mounted on end and projecting from said plate in outwardly inclining relation, chuck jaws slidably mounted on said posts to move in relatively converging and diverging directions thereon, and draw means to pull said chuck jaws downwardly on said posts.

3. A work holder, according to claim 2, characterized in that said draw means comprises a reciprocable disc in concentric relation to said circular series of posts, and flexible connections between said disc and said chuck jaws.

4. A work holder, including a mounting plate, a circular series of chuck jaw mounting devices on said plate providing slideways inclining upwardly in divergent relation to the axis of said series, chuck jaws slidably mounted on said devices to move in relatively converging and diverging directions thereon, and work gripping portions on said jaws, the work gripping portions on certain jaws being in longitudinally spaced relation to the work gripping portions of certain other jaws.

5. A work holder, including a mounting plate, a circular series of chuck jaw mounting devices on said plate providing slideways inclining upwardly in divergent relation to the axis of said series, chuck jaws slidably mounted on said devices to move in relatively converging and diverging directions thereon, draw means reciprocable in a fixed path concentrically of the axis of said series, and flexible connections between said draw means and said chuck jaws.

6. A work holder, including a mounting plate, a circular series of chuck jaw mounting devices on said plate providing slideways inclining upwardly in divergent relation to the axis of said series, chuck jaws slidably mounted on said devices to move in relatively converging and diverging directions thereon, a common connector means between said jaws and adjustable to move said jaws in said slideways and means on said jaws for work gripping in longitudinally spaced transverse planes, certain of said jaws having work gripping portions in one transverse plane and certain other of said jaws having work gripping portions in another and longitudinally spaced transverse plane.

7. A chuck according to claim 6, characterized in that said certain jaws and said certain other jaws are arranged in alternating relation to one another.

8. A work holder, including a mounting plate, a circular series of posts stationarily mounted on said plate, said posts being installed on end and projecting upward in outwardly inclining relation, chuck jaws slidably mounted on said posts to move in relatively converging and diverging directions thereon, there being a single jaw or adjacent pairs of posts, draw means to pull said jaws toward said plate, said jaws moving in a relative approaching direction in response thereto, and work gripping means individually mounted on said jaws and individually replaceable thereon to suit the requirements of the work.

9. A work holder, including a mounting plate, a circular series of jaw mounting devices on said plate providing slideways inclining outwardly of the plate and away from the axis of said circular series, chuck jaws slidably mounted on said devices to move in relatively converging and diverging directions thereon, draw means mounted in said plate for longitudinal sliding motion coaxially of said circular series, and flexible connectors between said draw means and said jaws.

10. A work holder, including a mounting plate, a circular series of jaw mounting devices on said plate providing slideways inclining outwardly of the plate and away from the axis of said circular series, chuck jaws slidably mounted on said devices, certain of said jaws having work gripping portions differing in their characteristics from the work gripping portions of certain other jaws, draw means reciprocably mounted in said plate, and operating connections between said draw means and said chuck jaws including lost motion means in the connections to certain jaws.

11. A work holder, including a mounting plate, a circular series of jaw mounting devices on said plate providing slideways inclining outwardly of the plate and away from the axis of said circular series, chuck jaws slidably mounted on said devices, jaw means reciprocably mounted in said plate, and operating connections to draw said jaws inwardly on said slideways in a sequential order in response to movement of said draw means in one direction.

12. A work holder according to claim 11, characterized by individual operating connections between said draw means and said chuck jaws, certain individual connections incorporating lost motion means for continued movement of some of said jaws relative to others.

13. A work holder, including a mounting plate, a circular series of jaw mounting devices on said plate providing slideways inclining outwardly of the plate and away from the axis of said circular series, chuck jaws slidably mounted on said devices, certain of said jaws having work gripping portions defining a socket to receive a work piece and certain other of said jaws having work gripping portions longitudinally spaced from the work gripping portions of said certain jaws, draw means reciprocably mounted in said plate, and connections between said draw means and said chuck jaws utilizing a given extent of movement of said draw means to achieve a motion of said certain chuck jaws which is less than the motion achieved by said certain other chuck jaws.

14. A work holder, according to claim 13, characterized in that said connections include arms intermediate said draw means and said certain chuck jaws absorbing in a flexing motion thereof a part of the movement of said draw means.

References Cited in the file of this patent

UNITED STATES PATENTS

| | | |
|---|---|---|
| 1,135,057 | Schultis | Apr. 13, 1915 |
| 1,783,420 | Garno | Dec. 2, 1930 |